United States Patent Office 2,879,161
Patented Mar. 24, 1959

2,879,161

STABLE DRY POWDER COMPOSITIONS CONTAINING CHOLINE CHLORIDE AND METHODS OF PREPARING SAME

William Valentine, Nanuet, and Joseph F. Weidenheimer, Pearl River, N.Y., assignors to American Cyanamid Company, New York, N.Y., a corporation of Maine No Drawing. Application May 14, 1956
Serial No. 584,455

6 Claims. (Cl. 99—2)

This invention relates to choline chloride prepared as dry powders by intermixing it with silica aerogels whereby a substantially dry, stable, free-flowing choline chloride-containing power can be formed having a higher proportion of the choline chloride than has been previously known.

Choline chloride (2-hydroxyethyl)trimethylammonium chloride, in the solid state, occurs as deliquescent crystals which are very soluble in water or alcohol. Its aqueous solution is practically neutral. It is used as a nutritional factor, i. e. as a supplement to the natural diet, for example, in poultry. Because of its deliquescence, choline chloride is extremely difficult to handle. Unless it is kept in a completely dry atmosphere, it very quickly absorbs water and becomes amorphous, sticky and finally liquid. In the liquid form, it is of the consistency of thick maple syrup. Moreover, a greater difficulty occurs in the presence of water in that the choline chloride hydrolyses to the hydroxide which is strongly alkaline. To overcome this instability in both chemical and physical form, many attempts have been made in the past to find some means of handling choline chloride that will eliminate these difficulties. None up to the present have fully answered the problem which are associated with this material. Various carriers have been proposed, but where one might be able to successfully maintain the choline chloride in a dry state, one is unable to incorporate a sufficient quantity of the choline chloride on the carrier to make the combination economically feasible. Moreover, some of the carriers are objectionable from the standpoint of taste, smell, bulk, etc.

The present invention overcomes all of these difficulties. A substantially larger amount of choline chloride, at least twice as much as in known preparations, can be incorporated on the silica aerogel carrier of this invention. Moreover, there is no odor associated with these silica aerogel carriers.

The silica aerogels of this invention are any of a number of commercially available aerogels produced either in the vapor phase or in the liquid phase. The most important characteristic of these aerogels is their extremely large surface area; this may run between 100 to 400 square meters/gram. The silica aerogels are dry highly porous powders having a particle size from about 5 millimicrons to about 5 microns. They contain somewhere between 85% and 98% silica, the remainder being made up of various organic and inorganic constituents. The silica may be present as silicon dioxide, silicic acid, or silicic acid salts such as calcium silicate. The silica is the only important constituent of the silica aerogel; as long as the other constituents are non-toxic, their identity is immaterial.

Any commercial form of choline chloride may be used in this invention. For example, choline chloride as a 70% aqueous solution conventionally found on the commercial market may be used. Alternately, crystalline choline chloride may be used. From a cost standpoint and from a standpoint of ease of handling, etc., the 70% aqueous choline chloride is preferable for the purposes of this invention. This is in striking contrast to the present commercial products containing choline chloride, for it has not been feasible to effectively use the well known 70% aqueous choline chloride in most commercial products because of hydrolysis.

The compositions of the present invention are useful as supplements in animal feeds. The fact that two to three times as much choline chloride per unit weight can be added to the carriers of this invention as compared to presently known commercial products makes the compositions of this invention outstandingly valuable in this field. Moreover, the compositions of this invention can be used also in pharmaceutical preparations with the same advantages.

As specific examples, certain embodiments of the present invention, are set forth in an illustrative sense only, in no way to be considered as limiting, by the following examples:

*Example 1*

Four hundred grams of a silica aerogel having a particle size of about 3 to 5 microns and a surface area of between 110 and 150 square meters/gram were added gradually to 600 grams of a 70% aqueous solution of choline chloride with agitation. When the addition of the silica aerogel was completed, the mixture was passed through a 40 mesh screen. The resulting screened mixture was a free-flowing powder assaying about 40% choline chloride on an anhydrous weight/weight basis.

*Example 2*

The free-flowing powder obtained in Example 1 was divided into two equal portions. One portion was dried for 24 hours at 120° F. This dried powder was then mixed with a sufficient quantity of additional aqueous choline chloride (70% solution) such that the resulting mixture contained, on a weight/weight basis, 71.4% of the dry powder and 29.6% of additional aqueous choline chloride. As in Example 1, the two materials were mixed gradually with agitation and the resulting mixture passed through a 40 mesh screen. The resulting screened mixture was a dry free-flowing powder assaying about 56.7% choline chloride on an anhydrous weight/weight basis. This dry free-flowing powder, assaying 56.7% choline chloride, and that prepared in Example 1, assaying about 40% choline chloride, were each encapsulated as components of a powder containing dl-methionine, inositol, folic acid, and vitamin $B_{12}$. These two lots of capsules were observed periodically over a period of about 8 months. No stability problems were encountered with either choline chloride, vitamin $B_{12}$ or folic acid from an assay standpoint; nor were any problems encountered from the standpoint of physical manifestations of degradation.

*Example 3*

The procedure of Example 1 was repeated using the silica aerogel of Example 1 in the same quantity and 600 gms. of a 70% aqueous solution of choline chloride. The silica aerogel was very carefully added in small quantities with careful blending to the aqueous solution of choline chloride. After each successive small addition, blending was carried on by hand in order to insure uniform distribution of the two components, one with the other. When the addition and blending of the silica aerogel was completed the mixture was passed through a 40-mesh screen. The resulting mixture was a free-flowing powder assaying about 42% choline chloride on an anhydrous weight/weight basis. This free-flowing powder was dried for about 24 hours at about 49° C. This dried powder was then carefully hand mixed with a sufficient quantity of additional aqueous choline chloride (70% solution) such that the resulting mixture contained on a weight/weight basis about 67% of the dried powder and about 33% of additional aqueous choline chloride. This mixture of the dried powder and the additional aqueous choline chloride was passed through a 40-mesh screen. The resulting screened mixture was a dry free-flowing powder assaying about 65% choline chloride on an anhydrous weight/weight basis. This screened mixture was stored for three days at 75% relative humidity at room temperature (24° C.). At the end of this storage period it remained free-flowing, showing no tendency towards wetting or lumping.

Example 4

A 60 g. quantity of a 70% aqueous solution of choline chloride was added gradually with agitation to a 40 g. quantity of each of the following silica aerogels having the characteristics set forth below:

(1) particle size of from about 3 to 5 microns and a surface area of approximately 110 to 150 square meters/gram.

(2) particle size of from about 15 millimicrons to about 20 millimicrons and a surface area of about 175 to 200 square meters/gram (silica as calcium silicate).

(3) particle size of from about 50 millimicrons to about 100 millimicrons and a surface area of about 200 square meters/gram.

(4) particle size of from about 8 to 10 millimicrons and a surface area of about 285 to 335 square meters/gram.

Each of the four mixtures was divided into two portions, one portion of each mixture being stored at 45% relative humidity and room temperature, and one portion of each mixture being stored at 75% relative humidity and room temperature (24° C.) for a period of three days. At the end of this storage period all eight samples remained free-flowing, showing no tendency towards wetting or lumping.

Example 5

To 50 grams of a silica aerogel having a particle size of about 3 to 5 microns and a surface area of about 110 to 150 square meters/gram were added gradually 50 grams of crystalline choline chloride. The blend was free-flowing after 3 days' storage at 75% relative humidity and room temperature (24° C.). To a small portion of this blend was added an equal portion by weight of a typical animal feed supplement, Fortifeed 2–22, and thoroughly mixed. After 3 days at 75% relative humidity and room temperature, the latter blend was still free-flowing. Such a blend represents an animal feed supplement rich in choline chloride superior to the 25% choline chloride blend presently found on the commercial market.

Example 6

The procedure of Example 5 was repeated using 40 grams of the silica aerogel of Example 5 and 60 grams of crystalline choline chloride (40 mesh). Upon exposure to 75% relative humidity for 3 days at room temperature (24° C.), the powder remained free-flowing and substantially dry.

Example 7

To 600 grams of the silica aerogel of Example 5 in a Hobart mixer under agitation, were added slowly 600 grams of crystalline choline chloride. After 15 minutes of mixing the blend received sufficient denatured ethyl alcohol to render it wet enough for satisfactory granulating. The granulates were heated at 52° C. for 15 minutes to remove the excess alcohol and then passed through a 30 mesh screen (U.S. standard sieve series). The dry granules passing through the 30 mesh screen remained substantially dry and free-flowing after 3 days' exposure to 75% relative humidity at room temperature.

The following chick assay indicates that choline chloride on silica aerogels is fully available for the chicks and that there are no toxic manifestations.

| Supplement per kg. diet: | Wt. at 28 days, gms. |
|---|---|
| None (control) | 150 |
| .5 gm. choline chloride | 229 |
| 1.0 gm. choline chloride | 286 |
| 1.0 gm. silica aerogel-chlorine chloride equivalent to 5 gm. choline chloride [1] | 223 |
| 2.0 gm. silica aerogel-choline chloride equivalent to 1.0 gm. chlorine chloride [1] | 257 |

[1] Silica aerogel-choline chloride combination similar to that of Example 4 or 6.

A number of combinations of choline chloride with silica aerogels have been described above to illustrate the invention involved. It is obvious, however, that those skilled in the art will be able to substitute other equivalent silica aerogels. It is therefore not intended to limit the invention to the specific combinations illustrated above but to cover this combination limited only by the scope of the appended claims.

We claim:

1. A stable, substantially dry, free-flowing powder comprising choline chloride and a silica aerogel, said powder containing not substantially more than 65% choline chloride on an anhydrous weight basis, said silica aerogel having a surface area of from about 100 to about 400 square meters/gram and being present in an amount not substantially less than about 35% by weight.

2. A stable, substantially dry, free-flowing powder as in claim 1 wherein the particle size of said silica aerogel is between about 5 millimicrons and about 5 microns.

3. A stable, substantially dry, free-flowing powder comprising choline chloride and a silica aerogel having a particle size of from about 3 to about 5 microns and a surface area of from about 110 to about 150 square meters/gram, said choline chloride and said silica aerogel being present in a ratio of from about 35% to 65% by weight of said choline chloride on an anhydrous basis to from about 35% to about 50% by weight of said silica aerogel.

4. A process for the production of a stable, substantially dry, free-flowing powder containing a major amount of choline chloride which comprises adding an amount, not substantially greater than 65 parts by weight on an anhydrous basis, of choline chloride to not substantially less than 35 parts by weight of a silica aerogel having a particle size of from about 5 millimicrons to about 5 microns and a surface area of from about 100 to about 400 square meters/gram and thoroughly blending the mixture so obtained.

5. A process as in claim 4 wherein said silica aerogel has a particle size of from about 3 to about 5 microns and a surface area of from about 110 to about 150 square meters/gram.

6. A process as in claim 5 wherein the ratio of said choline chloride to said silica aerogel is in the range of 35 to 65 parts by weight of said choline chloride on an anhydrous basis to 35 to 50 parts by weight of said silica aerogel.

References Cited in the file of this patent

UNITED STATES PATENTS

| 2,162,609 | Dawe | June 13, 1939 |
| 2,257,545 | Curtis | Sept. 30, 1941 |
| 2,729,672 | Callahan et al. | Jan. 3, 1956 |
| 2,765,231 | Plitt | Oct. 2, 1956 |